United States Patent
Dziedzic (10) Patent No.: US 12,507,637 B2
(45) Date of Patent: Dec. 30, 2025

(54) PLANT CONTAINER FOR GREENING WALLS AND A GREENING WALL

(71) Applicant: 4NATURESYSTEM—WERTYKALNI SP. Z O. O., Warsaw (PL)

(72) Inventor: Beata Dziedzic, Warsaw (PL)

(73) Assignee: 4NATURESYSTEM—WERTYKALNI SP. Z O. O., Warsaw (PL)

( * ) Notice: Subject to any disclaimer, the term of this patent is extended or adjusted under 35 U.S.C. 154(b) by 396 days.

(21) Appl. No.: 17/670,657

(22) Filed: Feb. 14, 2022

(65) Prior Publication Data

US 2022/0264807 A1    Aug. 25, 2022

(30) Foreign Application Priority Data

Feb. 19, 2021   (EP) ..................... 21461517

(51) Int. Cl.
*A01G 9/02* (2018.01)
*A01G 27/00* (2006.01)

(52) U.S. Cl.
CPC ........... *A01G 9/025* (2013.01); *A01G 27/005* (2013.01)

(58) Field of Classification Search
CPC ............ A01G 9/023–025; A01G 27/00; A01G 27/005; A01G 27/008
See application file for complete search history.

(56) References Cited

U.S. PATENT DOCUMENTS

| | | | | |
|---|---|---|---|---|
| 8,959,834 B2 * | 2/2015 | Hashimoto | ............ | A01G 9/025 47/79 |
| 2010/0186295 A1 * | 7/2010 | Rodrigues | ............. | A01G 9/025 47/65.6 |
| 2012/0186148 A1 * | 7/2012 | Chang | ................... | A01G 9/027 47/41.01 |
| 2012/0272573 A1 * | 11/2012 | Hashimoto | ............ | A01G 9/025 47/80 |
| 2013/0014438 A1 * | 1/2013 | Teng | ..................... | A01G 9/025 47/67 |
| 2013/0152467 A1 * | 6/2013 | Chang | ................... | A01G 9/025 47/79 |

(Continued)

FOREIGN PATENT DOCUMENTS

| CN | 103243739 A | 8/2013 |
|---|---|---|
| CN | 105850555 A | 8/2016 |

(Continued)

OTHER PUBLICATIONS

Machine Translation of KR-101247700 (Year: 2025).*

*Primary Examiner* — Peter M Poon
*Assistant Examiner* — Hae Rie Jessica Byun
(74) *Attorney, Agent, or Firm* — Rivka Friedman (57) ABSTRACT

A plant container for greening walls has a main body defining a chamber to receive a growth medium for a plant. A draining pipe is coupled with the main body, extends along a back wall of the main body and has a top end, a bottom end and an opening in a wall of the draining pipe to allow water from inside the chamber to enter inside the draining pipe. The opening in the wall of the draining pipe extends from a bottom wall of the main body. A connecting conduit is configured to connect the bottom end of the draining pipe with a top end of the draining pipe of another plant container of the same type. A through hole extends along the whole length of the draining pipe.

12 Claims, 9 Drawing Sheets

(56) References Cited

U.S. PATENT DOCUMENTS

2015/0096229 A1* 4/2015 Chang .................... A01G 9/025
                                                    47/79
2018/0125018 A1* 5/2018 Leung ....................... E03F 3/04

FOREIGN PATENT DOCUMENTS

| CN | 107343468 A * | 11/2017 | ........... A01G 27/005 |
| EP | 2856859 A1 | 4/2015 | |
| GB | 2482482 A * | 2/2012 | ............ A01G 27/00 |
| KR | 101247700 B1 * | 3/2013 | |
| KR | 102319860 B1 * | 11/2021 | |
| WO | 2012081945 A2 | 6/2012 | |
| WO | WO-2022086242 A2 * | 4/2022 | |

* cited by examiner

PLANT CONTAINER FOR GREENING WALLS AND A GREENING WALL

TECHNICAL FIELD

The present invention relates to greening walls, in particular to plant containers for greening walls.

BACKGROUND

A greening wall is a vertical structure that comprises containers with green plants. The containers are provided as a support for growth medium, such as soil or substitute substrate, in which individual plants may grow. Typically, the greening wall is provided with an irrigation system that supplies water to individual containers.

Typically, plant containers have drainage holes located at a bottom wall—such draining holes have a disadvantage such that when a plurality of containers are arranged in a column over each other, the lowest-located container will receive excess water from all containers located above it and consequently the soil therein may be watered excessively. Moreover, the dripping water may contain particles of soil that may stain the plants at which it drips. Moreover, the dripping water may flow over the leaves of the plant outside the container, which poses a risk of flooding the floor below the green wall. Therefore, the amount of water delivered to each container must be precisely controlled (which is difficult), and shall depend on the position of the container at the greening wall (i.e. the amount of water to be delivered to the containers positioned below other containers shall take into account the amount of water that will drip from the containers above it).

SUMMARY OF THE INVENTION

There is a need to provide a plant container for greening walls that will allow to effectively control the amount of water that is delivered to the growth medium and remains in the container, such as to facilitate uniform watering of all containers of a vertical greening wall.

In one aspect, the invention relates to a plant container for greening walls that comprises a main body defining a chamber for receiving a growth medium for a plant. A draining pipe is coupled with the main body, extends along a back wall of the main body and has a top end, a bottom end and an opening in its wall for allowing water from inside the chamber to enter inside the draining pipe. The opening extends from a bottom end of the main body. A connecting conduit is provided and configured to connect the bottom end of the draining pipe with a top end of a draining pipe of another plant container of the same type. Thereby, the draining pipe can collect water from within the bottom chamber of the container and the collected water can be transferred, via the connecting conduit, to the draining pipe of another plant container. This allows to build a greening wall with a plurality of containers located one above each other, such that water from their chambers is collected into the draining pipes and can flow through the draining pipes towards the bottom of the greening wall. The connecting conduit of the bottom-most container of the greening wall can be connected to a reservoir for collecting the excess water drained from all the containers above it. Since each draining pipe has its top end positioned above its bottom end, water flows under the force of gravity along the internal walls of the draining pipes, via though holes that extend along the whole length of the draining pipes, to the collecting reservoir at the bottom of the greening wall rather than outside the draining pipe to the chambers of lower-positioned containers. Thereby, excess water is efficiently removed from the container and the drained water does not impact the containers located below. Consequently, each container can be watered independently of other containers. Moreover, the containers do not accumulate water from other containers.

The draining pipe can extend vertically along the main body. This facilitates water flow downwards the draining pipe. However, other arrangements are possible as well, wherein the draining pipe is inclined or curved. Preferably, its wall shall be inclined downwards along its whole length.

The draining pipe can be formed integrally with the back wall, i.e. such that the back wall of the container forms the back wall of the draining pipe. In that case, the top end of the draining pipe is preferably located along the vertical line above the bottom end, which makes it easy to connect the draining pipes of successive containers in a vertical column. However, other locations of the draining pipe are possible as well, such as along the side walls or the front wall of the container.

The connecting conduit can be formed integrally with the container, i.e. it can be formed of the same material as the container at a position adjacent to the bottom end of the draining pipe and have a form of a pipe that has at its end an external diameter not larger than the internal diameter of the top end of the draining pipe, such that the connecting conduit can be inserted to the draining pipe of another container. This facilitates water-tightness of the connection, namely in such a case the connecting conduit does not have to fit tightly into the lower draining pipe, as water will flow downwards under the force of gravity. Other forms of the connecting conduit are possible as well, such as various types of rigid or elastic pipes configured to be fit between the opposite ends of the draining pipes.

The opening in the wall of the draining pipe may be a slit that extends along the whole length of the draining pipe. This is particularly preferable when the draining pipe is vertical, as such construction allows manufacturing of the container in an injection molding process as a single piece that does not have to be subject to further machining operations to make it operative. Moreover, a long slit facilitates collection of excess water from the chamber to the draining pipe. However, other forms of openings are possible as well, such as a plurality of perforation holes. The opening (e.g. the slit or the perforations) may be positioned at one side of the draining pipe (e.g. at the side or at the front), it may be also located at different sides (e.g. perforations distributed at different sides).

The container may comprise an insert configured to be installed at a bottom end of the draining pipe to cover at least part of the opening. In particular, when the opening is a slit, the insert may obscure the slit at the bottom. Alternatively, when the opening has a form of perforated holes, the insert may obscure some of the holes at the bottom. The insert may allow to define a volume at the bottom of the chamber in which water is collected rather than being drained out of the chamber. Therefore, the greening wall may comprise a plurality of containers of a default type with the drain pipes with openings defined at the very bottom of the main body, and each container may have an insert installed that has a height selected according to the hydration needs of a particular plant that is to be installed in that container.

The container may have fasteners at a back wall of the main body, suitable for securing the main body to a greening wall structure. Preferably, the fasteners are hooks at the top edge of the back wall, by means of which the container may be hanged on the greening wall structure elements. It is particularly preferable if the hooks are positioned asymmetrically off-center, such that a two containers can be hanged on a horizontal bar of the greening wall structure at the opposite sides of that wall and not interfere with each other.

At least one rib may extend along the internal portion of at least one wall—of the main body. For example, the rib may extend from a top (or from close to the top, such as 10% of the wall height from the top edge) to a bottom (or to close to the bottom, such as 10% of the wall height from the bottom) of the side wall, the front wall and/or the back wall, or from front to the back of the bottom wall. The rib may be thin, i.e. it may have a height (measured as an extent by which it protrudes from the wall towards the chamber) greater than its width. Preferably, the rib forms a straight section along the wall (which makes it easy to manufacture), but it may also have other forms, such as curved, inclined or horizontal ones. Preferably, the ribs of the bottom wall form a continuation of the ribs of the side walls, the front wall or the back wall. If the growth medium is packed in an elastic pouch and inserted into the container, the rib allows to move the pouch away from the internal wall of the container, thereby allowing air to circulate around the pouch. Moreover, a plurality of ribs may be arranged in pairs or more multiples thereof, wherein the pair comprises two ribs parallel and close to each other (e.g. not farther than twice their height from each other), which forms an air channel between the ribs such that air can easily circulate between the wall and the pouch even if the pouch is quite loose.

In a preferred embodiment, if the draining pipe is located adjacently to the back wall, it may have the opening in a form of a longitudinal slit located at a side of the draining pipe (i.e. facing one of the side walls) and a rib may be formed at the back wall close to the opening (i.e. at a distance not exceeding twice the height of the rib), such that an air channel can be formed between the back wall and the slit and the pouch with the growing medium, which facilitates water drainage from the pouch to the opening of the draining pipe and prevents clogging of the opening and facilitates air access to the pouch.

The pouch with the growth medium that can be located within the chamber is preferably made of an elastic material, such as a textile fabric or non-woven fabric, having parameters that allow water and air to penetrate its surface so that water and air can get in and out of the pouch.

In another embodiment, the chamber may be configured to receive a plurality (i.e. two, three or more) of pouches positioned next to each other. In that case, the container may have a single drain pipe located centrally between the pouch inserting sites to receive water draining from all pouches or a plurality of drain pipes, each located at a position at which the pouch is to be inserted. The pouch inserting sites can be defined by a curvature of the front wall which may be shaped as to come closer to the back wall at a place between the pouch inserting sites, such as to hold the pouches in predetermined places.

The plant container may further comprise a recess in each of the side walls, for accommodating a horizontal water supply pipe which may extend along a row of containers positioned at the same level. The horizontal water supply pipe may contain at least one dripper located above each container such as to deliver water at a certain amount to the container. The horizontal water supply pipes may be connected to a vertical water supply line.

The container is preferably made of a rigid material, such as plastic. However, other materials can be used as well, such as steel if special functional or aesthetic properties are desirable. A plastic container can be formed in an injection molding process or in a 3D printing process. It can be made as a single-piece element or assembled from a plurality of elements.

The walls of the main body do not need to have a uniform flat form. They may be curved, round or oblique. In general, the terms a back wall, a side wall, a bottom wall and a front wall refer to portions of the container that are substantially facing the back, side, bottom or front of the container. In particular, the edge sections of the walls may be straight (in particular, between the side walls and the back wall) or curved (in particular, between the side walls and the front wall or between the bottom wall and the front wall). The side walls and the front wall may have their top edges positioned lower than the top edge of the back wall in order to allow mounting of containers one above each other with their back walls adjacent, and having some free space at the front to allow the plant to extend over the edges of the front wall.

In another aspect, the invention also relates to a greening wall comprising a plurality of containers as described herein mounted on a frame.

Further aspects and features of the present invention are described in following description of the drawings.

BRIEF DESCRIPTION OF DRAWINGS

Aspects and features of the present invention will become apparent by describing, in detail, exemplary embodiments of the present invention with reference to the attached drawings, in which.

DETAILED DESCRIPTION

Reference will now be made to embodiments, examples of which are illustrated in the accompanying drawings. Aspects and features of the embodiments will be described with reference to the accompanying drawings. In the drawings, like reference numerals denote like elements. The present invention, however, may be embodied in various different forms and should not be construed as being limited only to the illustrated embodiments. Rather, these embodiments are provided as examples so that this disclosure will be thorough and complete, and will fully convey the aspects and features of the present invention to those skilled in the art. It shall be understood that not all of the features shown in the embodiments are essential and the scope of the protection is defined not by means of literally shown embodiments, but by the features provided in the claims.

FIGS. 1-5A show a first embodiment of the invention which is a plant container for a single pouch. The container has a main body 100 comprising a back wall 101, two side walls 102, 103, a bottom wall 104 and a front wall 105. The walls 101-105 encompass a chamber 110 in which a growth medium 112 for a plant (and preferably with the plant 113) can be positioned.

Figure 1:
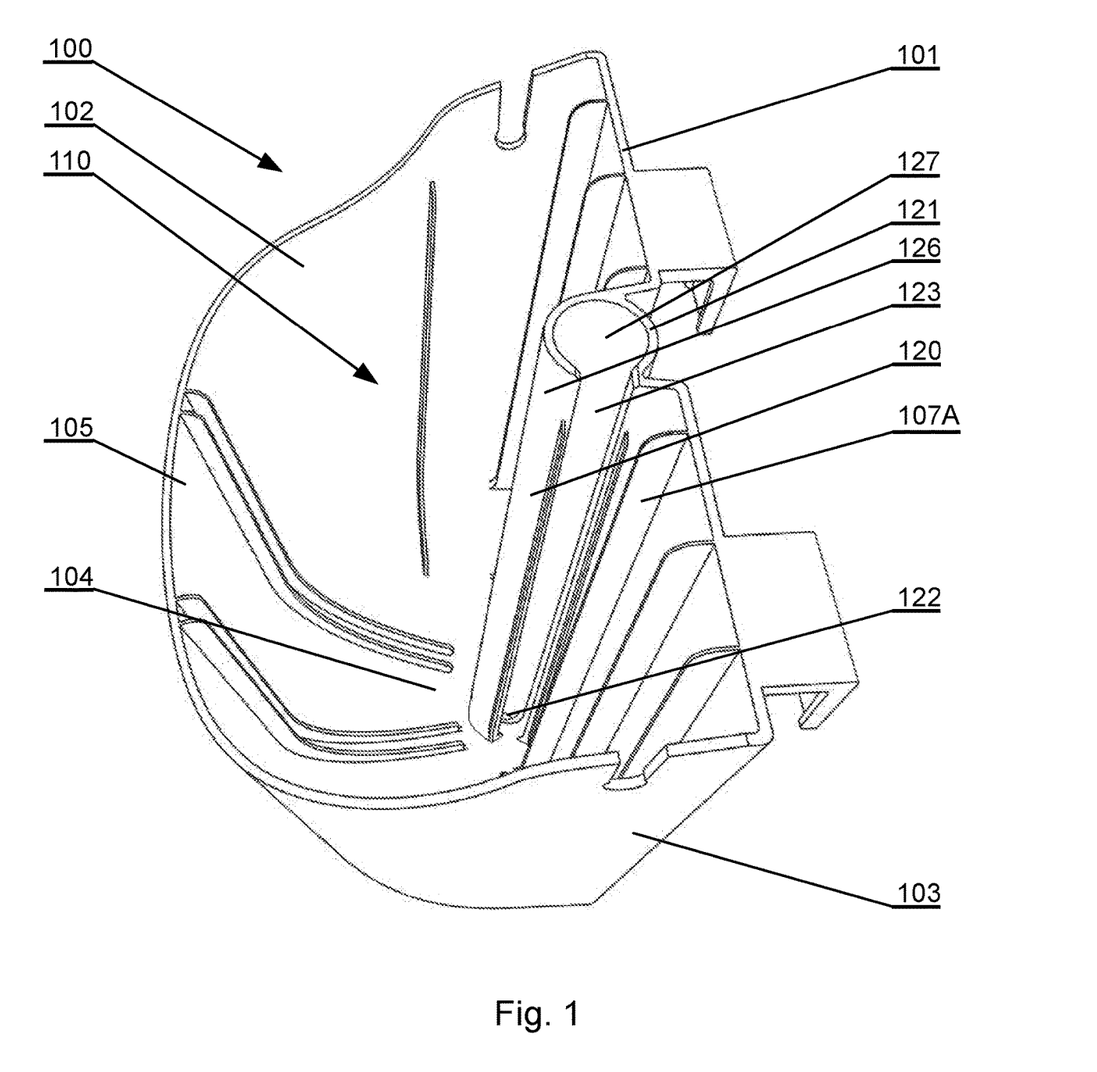
FIG. 1 shows a first embodiment of a container in a view from the front.
Figure 2:
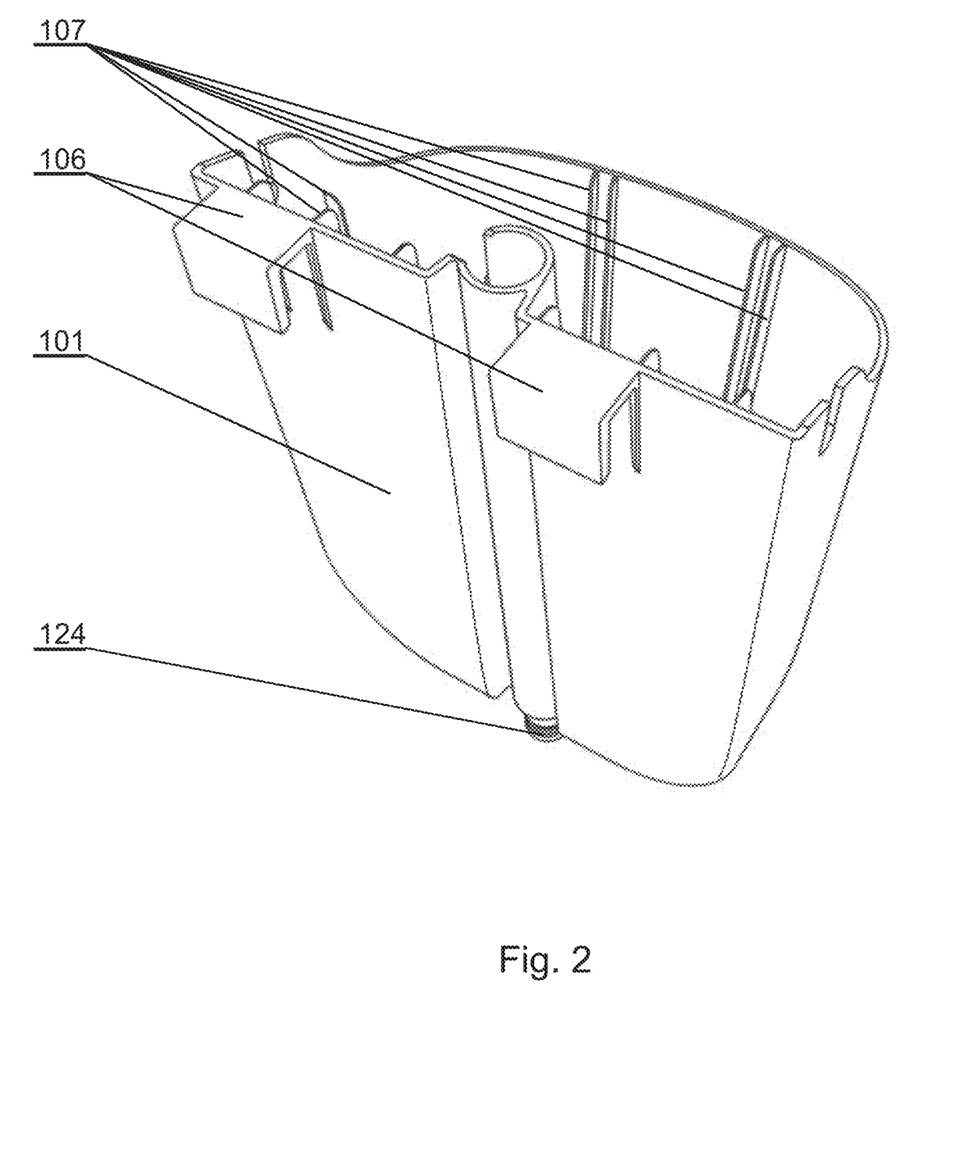
FIG. 2 shows the first embodiment of the container in a view from the back.
Figure 5A:
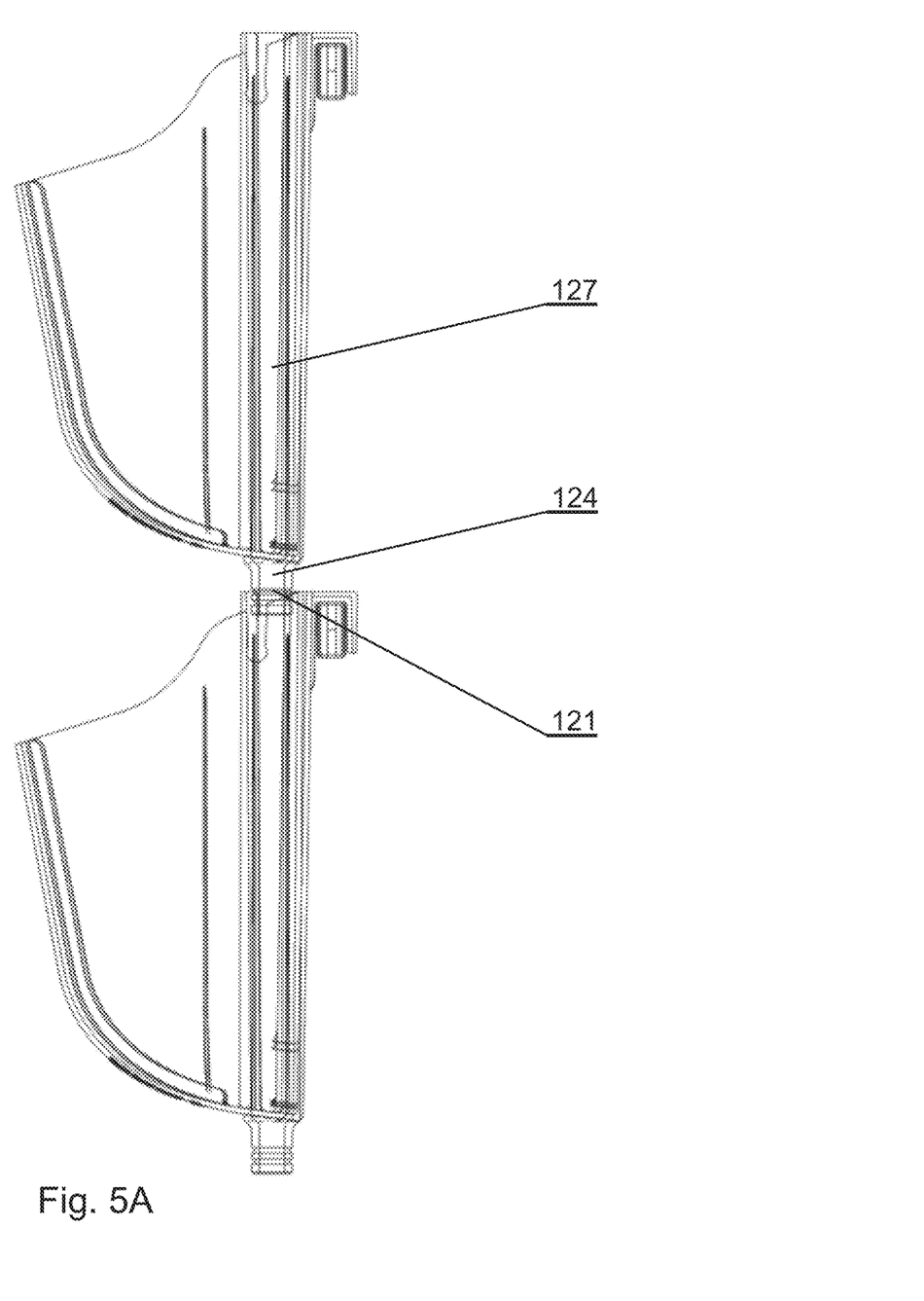
FIG. 5A shows two containers located one above another in a side view.

A draining pipe 120 is coupled with the main body 100 such that it is integrated with the back wall 101, wherein the back wall 101 of the main body 100 forms the back wall of the draining pipe 120. The draining pipe 120 has a top end 121 positioned vertically above a bottom end 122, and a connecting conduit 124 located adjacently to the bottom end 122. The connecting conduit 124 has a diameter smaller than the internal diameter of the top end 121 of the draining pipe 120, therefore it can be easily inserted into the draining pipe 120 of a container of the same type located below, as shown in FIG. 5A. The wall 126 of the draining pipe 120 has an opening 123 to allow water from inside the chamber 110 to enter inside the draining pipe 120. The opening 123 extends from a bottom wall of the main body (i.e. from where the draining pipe 120 intersects with the bottom wall 104). A through hole 127 extends along the whole length of the draining pipe 120.

Figure 3:
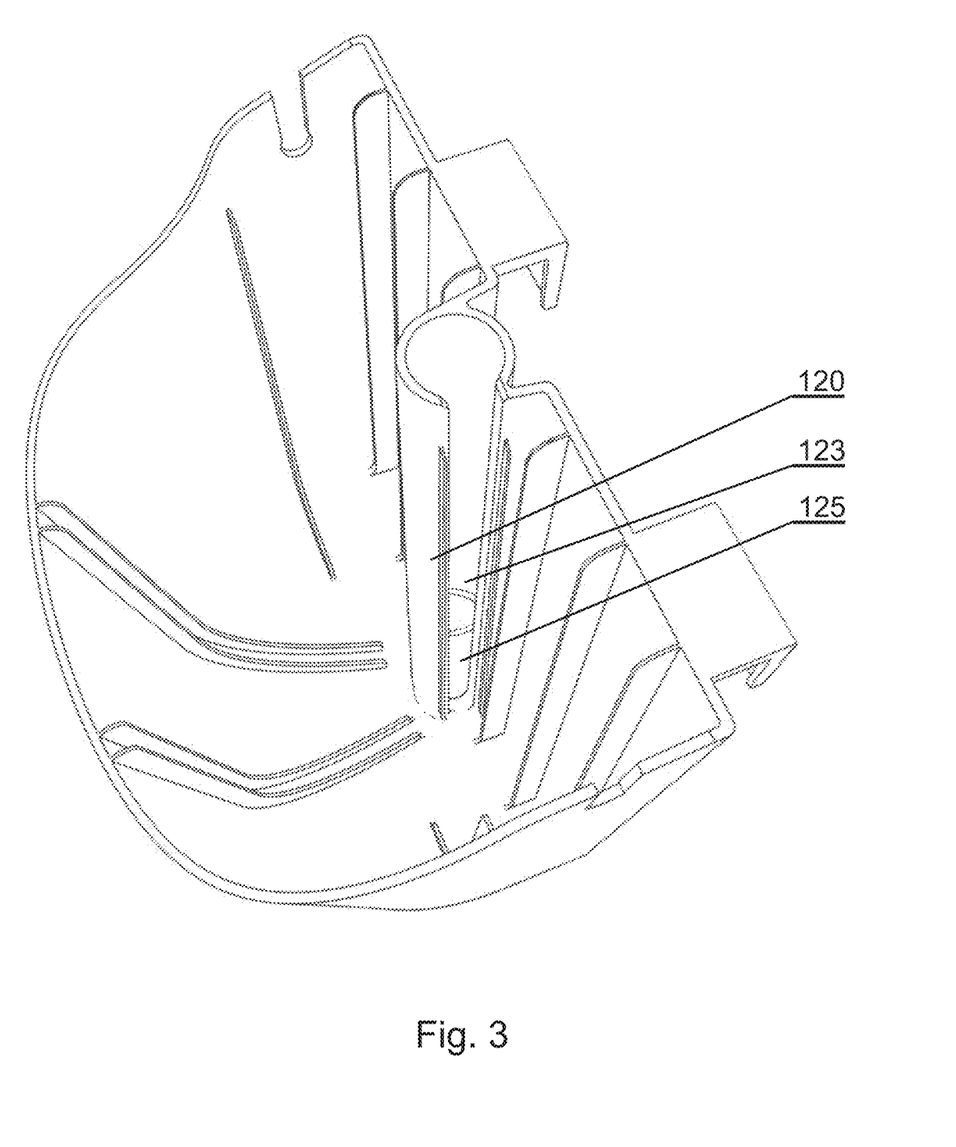
FIG. 3 shows the first embodiment of the container with an insert in a draining pipe.

As shown in FIG. 3, an insert 125 can be installed at a bottom end 122 of the draining pipe 120 to cover a bottom portion of the opening slit 123, such that some water can be collected at the bottom of the container up to the height of the insert 125, depending on the needs of the plant growing in that container.

Figure 8:
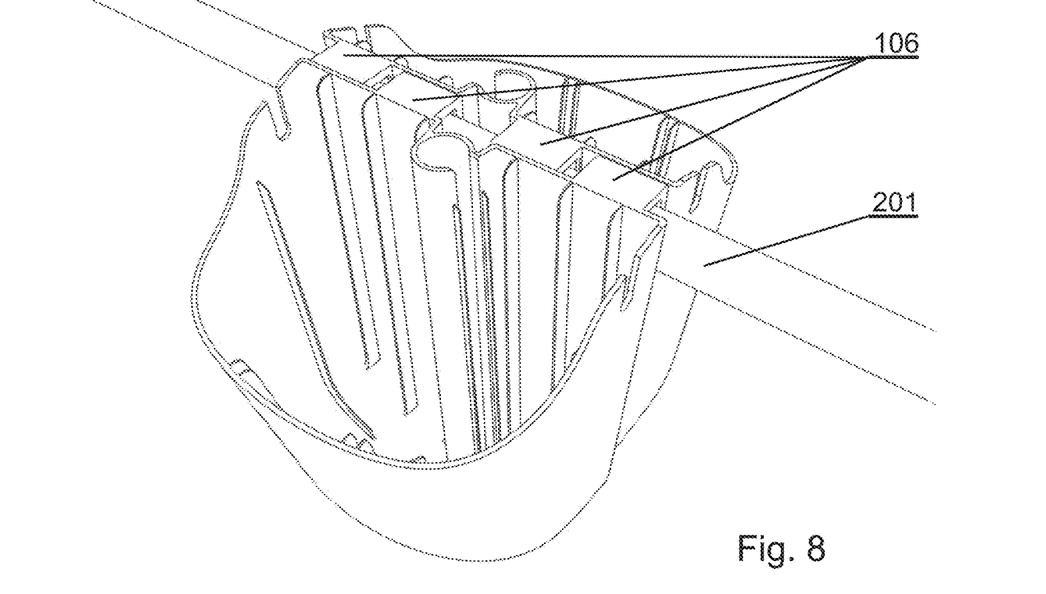
FIG. 8 shows two containers hanged at opposite sides of the greening wall.

A pair of off-centered hooks 106 is formed at the back wall 101 of the main body 100, by means of which the container may be hang on a greening wall structure, such as shown in FIG. 8, wherein two containers are hang at opposite sides of a horizontal bar 201 of the structure.

Figure 4:
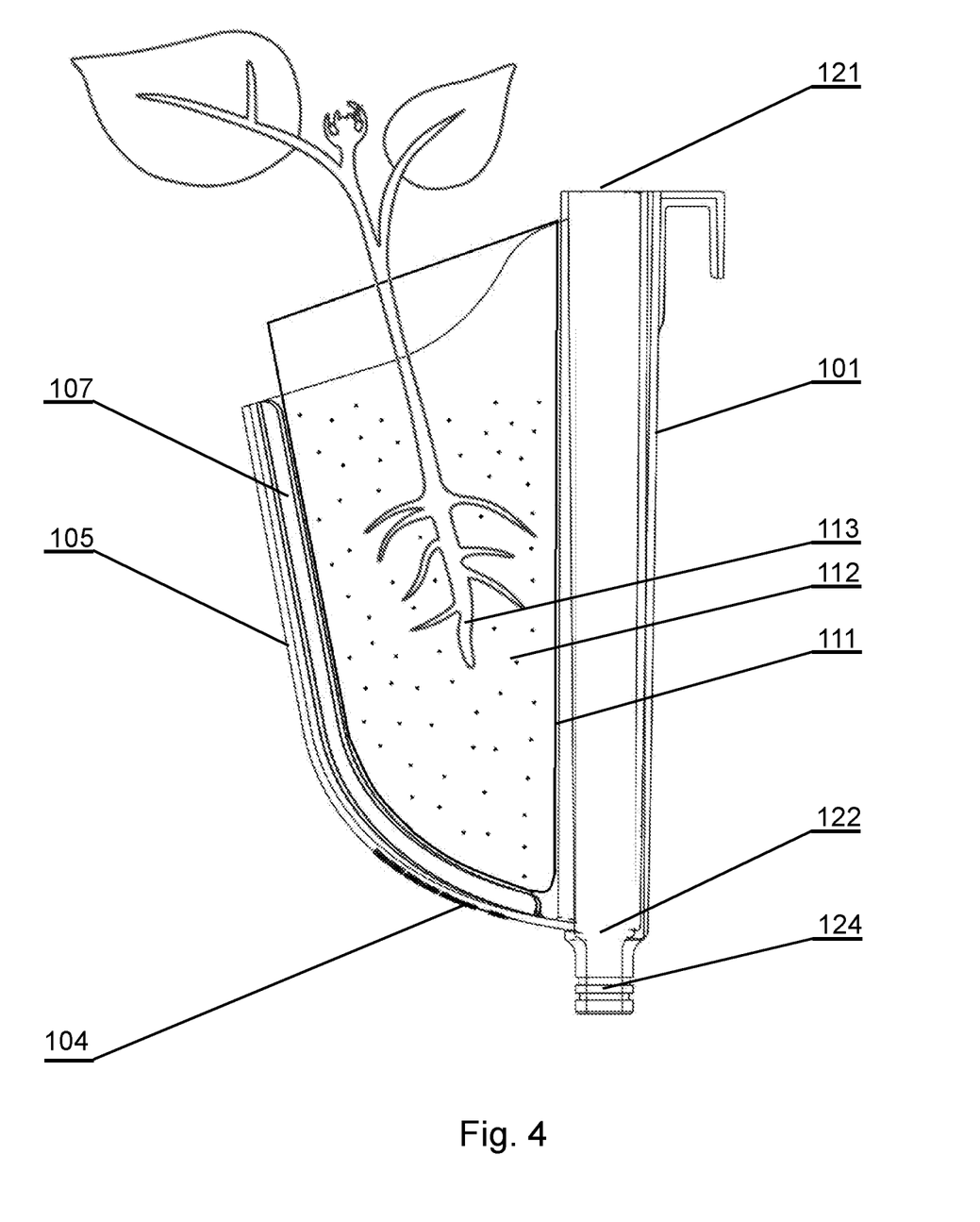
FIG. 4 shows the first embodiment of the container in a cross-sectional view.

A plurality of pairs of ribs 107 extend along all walls 101-105, which offset the pouch 111 with the growth medium 112 from the walls, as shown in FIG. 4. In particular, one of the ribs 107A is located at a distance not exceeding twice its height, from the slit 123 formed at a side wall of the draining pipe 120.

Figure 5B:
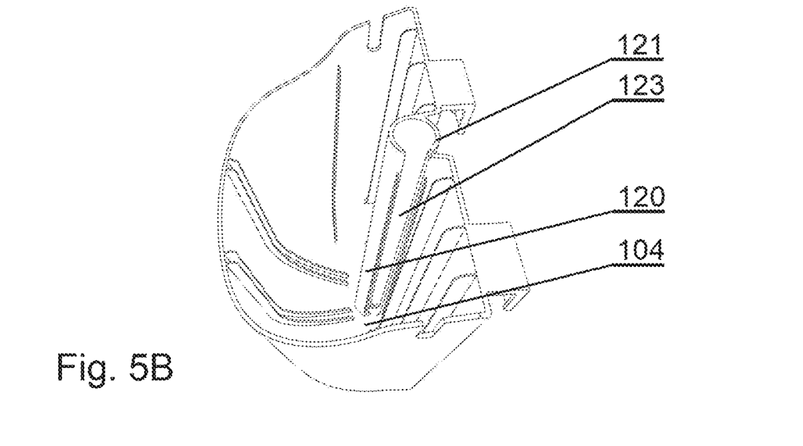
FIG. 5B shows a first configuration of a draining pipe.

In a first configuration, as shown in FIG. 5B, the draining pipe 120 may have the opening 123 extending through substantially the whole length of the draining pipe 120, i.e. from the bottom wall 104 of the main body 100 up to the top end 121 of the draining pipe.

Figure 5C:
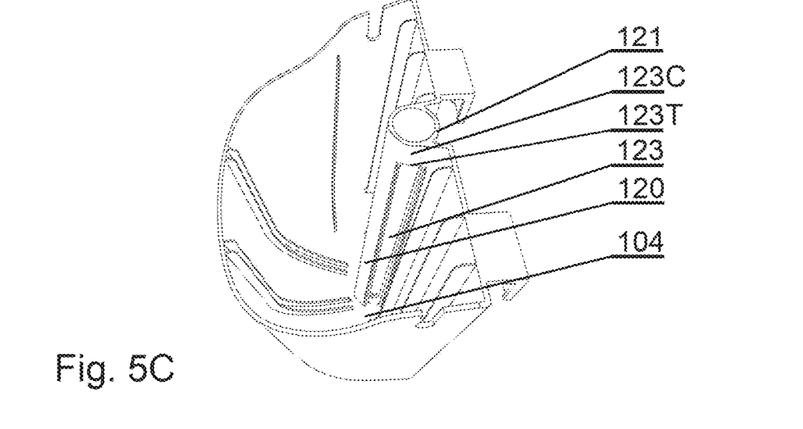
FIG. 5C shows a second configuration of the draining pipe.

In a second configuration, as shown in FIG. 5C, the draining pipe 120 may have the opening 123 extending only partially through the draining pipe 120, i.e. from the bottom wall 104 of the main body 100 up to a top end 123T of the opening 123, such that between the top end 123T of the opening 123 and the top end 121 of the draining pipe 120 the draining pipe has a fully closed circumferential wall 123C.

Figure 5D:
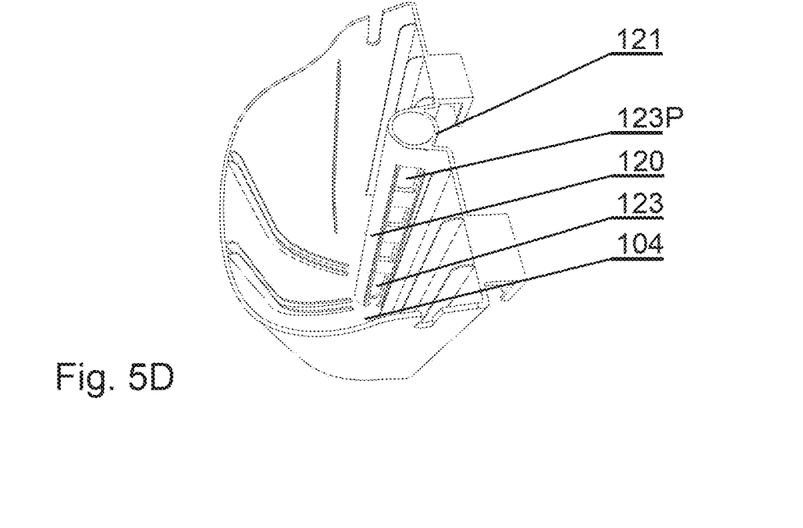
FIG. 5D shows a third configuration of the draining pipe.

In a third configuration, as shown in FIG. 5D, the draining pipe 120 may comprise a plurality of perforations 123P, wherein the bottom perforation forms an opening 123 extending from the bottom wall 104 of the main body 100 up to its top end 123T.

Figure 6:
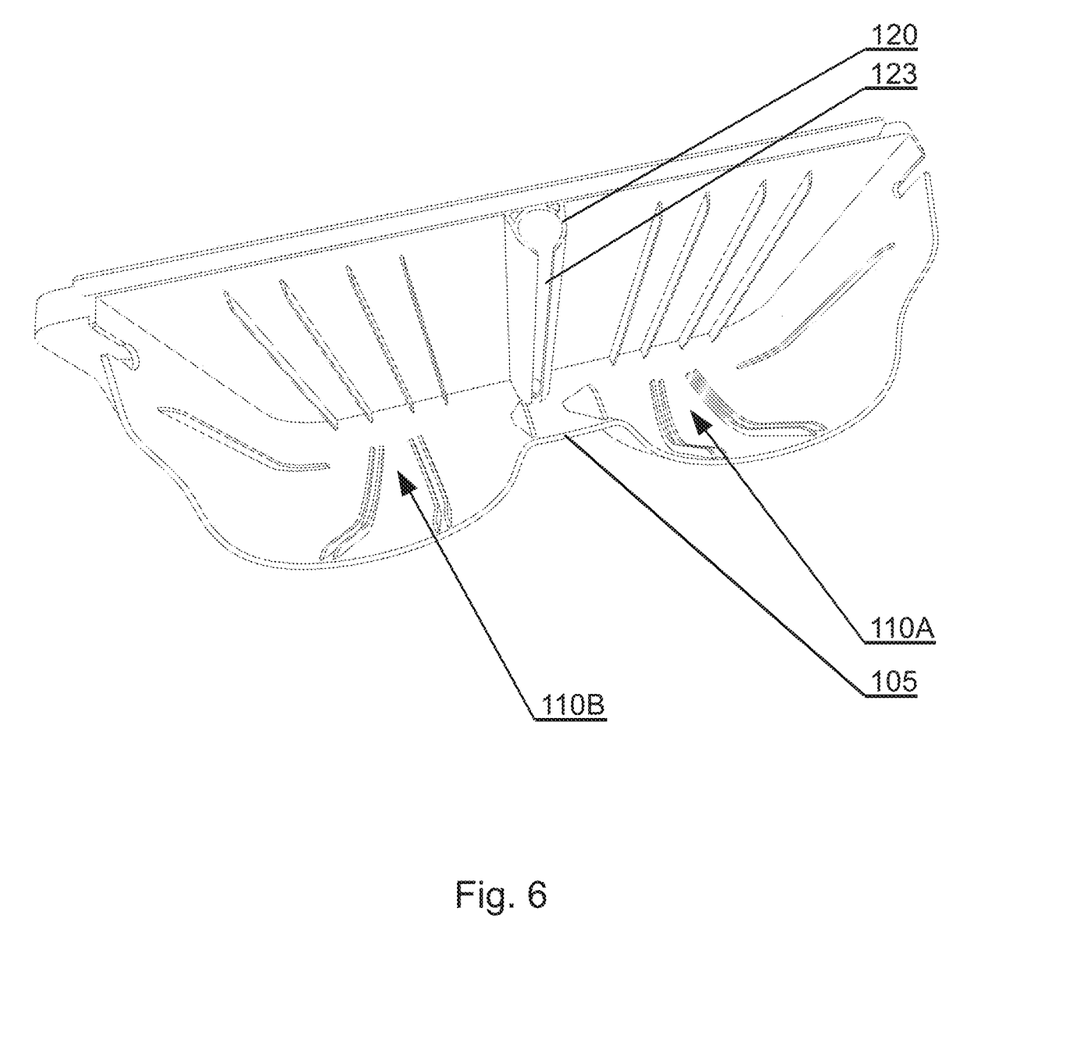
FIG. 6 shows the second embodiment of the container in a view from the back.

FIG. 6 shows a second embodiment of the container, which is similar to the first embodiment, with the following differences. The front wall 105 is curved, such that two sections 110A, 110B are defined within the chamber that allow to position two pouches therein. A single central drain pipe 120, preferably having the opening 123 facing the front wall 105, is present for collecting water from pouches located in both sections 110A, 110B, thereby the container can be used with the same type of the container or the type of the first embodiment, located above or below it. This type of container can be fastened to the greening wall structure by means of hooks as in the first embodiment or by screws inserted to attachment openings 109.

Figure 7:
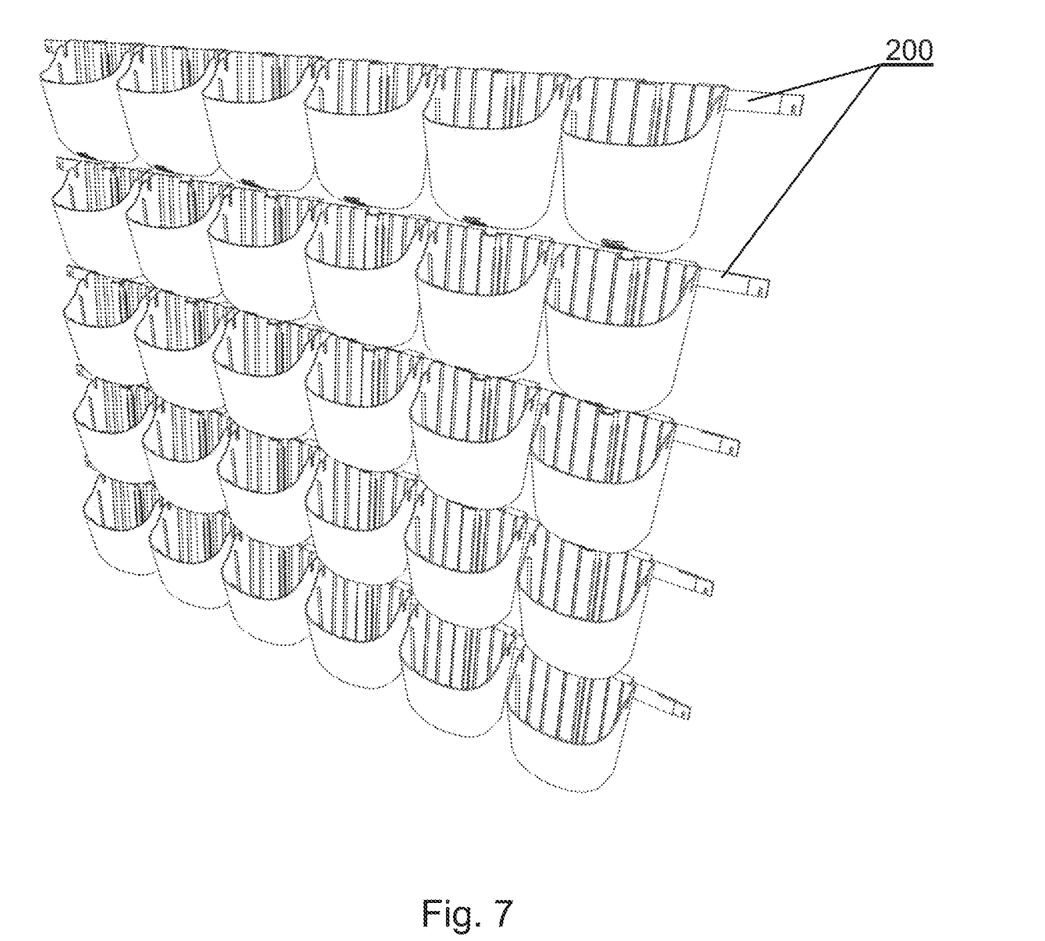
FIG. 7 shows an embodiment of a greening wall with a plurality of containers of the first embodiment.

FIG. 7 shows a greening wall formed from a plurality of plant containers of the first embodiment mounted on a frame 200.

Figure 9:
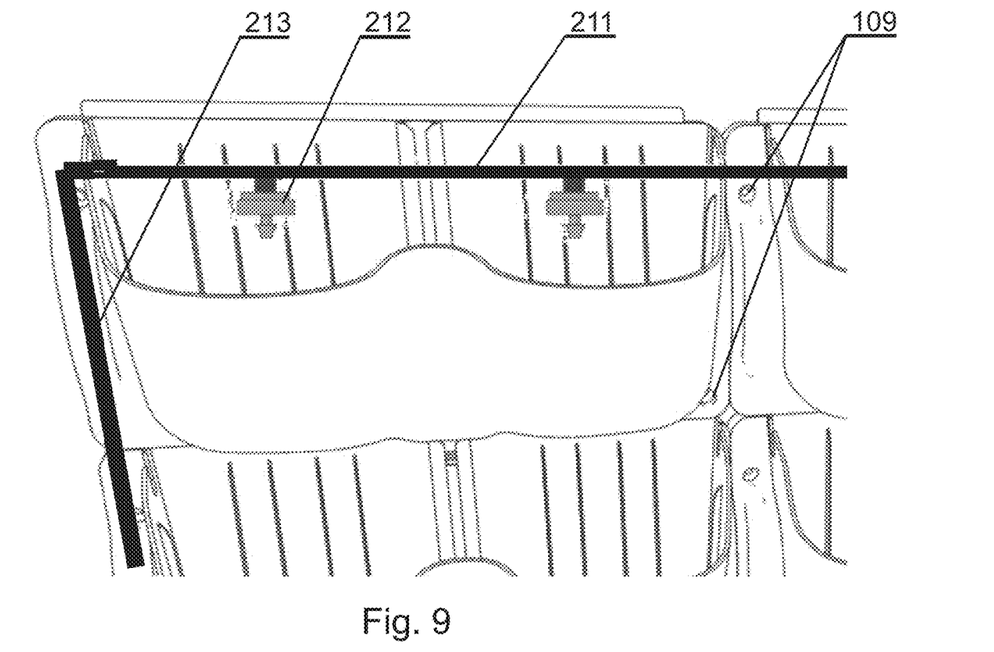
FIG. 9 shows a portion of a greening wall formed from a plurality of plant containers of the second embodiment.

FIG. 9 shows a portion of a greening wall formed from a plurality of plant containers of the second embodiment, with water supply pipes 211 with drippers 212 extend along each row of containers positioned at the same level. The horizontal water supply pipes 211 may be connected to common vertical water supply line 213.

Although the invention is presented in the drawings and the description and in relation to its embodiments, these embodiments do not restrict nor limit the presented invention. It is therefore evident that changes, which come within the meaning and range of equivalency of the essence of the invention, may be made. The presented embodiments are therefore to be considered in all aspects as illustrative and not restrictive. According to the abovementioned, the scope of the invention is not restricted to the presented embodiments but is indicated by the appended claims.

The invention claimed is:

1. A plant container for greening walls, comprising:
   a main body defining a chamber to receive a growth medium for a plant;
   a draining pipe coupled with the main body, extending along a back wall of the main body and having a top end, a bottom end and an opening in a wall of the draining pipe to allow water from inside the chamber to enter inside the draining pipe;
   wherein the opening in the wall of the draining pipe extends from a bottom wall of the main body and extends along the whole length of the draining pipe;
   a connecting conduit configured to connect the bottom end of the draining pipe with a top end of the draining pipe of another plant container of the same type;
   a through hole that extends along the whole length of the draining pipe; and
   an insert installed at the bottom end of the draining pipe to cover at least part of the opening.

2. The plant container according to claim 1, wherein the draining pipe extends vertically along the main body.

3. The plant container according to claim 1, wherein the draining pipe is formed integrally with the back wall of the main body.

4. The plant container according to claim 1, wherein the opening in the wall of the draining pipe has a form of a slit.

5. The plant container according to claim 1, further comprising fasteners at a back wall of the main body to secure the main body to a greening wall structure.

6. The plant container according to claim 1, further comprising at least one rib extending along the internal portion of at least one wall of the main body.

7. The plant container according to claim 1, further comprising a pair of ribs parallel to each other and extending along the internal portion of at least one wall of the main body.

8. The plant container according to claim 1, further comprising a recess in each of the side walls of the main body for accommodating a water supply pipe.

9. The plant container according to claim 1, further comprising a pouch with the growth medium located within the chamber.

10. The plant container according to claim 1, wherein the chamber is configured to receive a plurality of pouches positioned next to each other.

11. A greening wall comprising a frame and a plurality of plant containers mounted on the frame and comprising a middle plant container mounted below an upper plant container and above a lower plant container,
wherein each plant container comprises:
a main body defining a chamber to receive a growth medium for a plant;
a draining pipe coupled with the main body, extending along a back wall of the main body and having a top end, a bottom end and an opening in a wall of the draining pipe to allow water from inside the chamber to enter inside the draining pipe;
wherein the opening in the wall of the draining pipe extends from a bottom wall of the main body;
a connecting conduit configured to connect the bottom end of the draining pipe with a top end of the draining pipe of another plant container of the same type;
a through hole that extends along the whole length of the draining pipe; and
an insert installed at the bottom end of the draining pipe to cover at least part of the opening.

12. The greening wall of claim 11, wherein the plant containers are arranged in rows one above another, and further comprising water supply pipes with drippers extending along each row of containers, wherein at least one dripper is located above each plant container to deliver water to the chamber of the container.

* * * * *